(12) United States Patent
Frommann

(10) Patent No.: US 7,344,637 B2
(45) Date of Patent: Mar. 18, 2008

(54) APPARATUS FOR REMOVING FINE MATERIAL FROM A LIQUID

(75) Inventor: Christian Frommann, Neumarkt (DE)

(73) Assignee: Hans Huber AG Maschinen-und Anlagenbau (DE)

( * ) Notice: Subject to any disclaimer, the term of this patent is extended or adjusted under 35 U.S.C. 154(b) by 120 days.

(21) Appl. No.: 11/243,423

(22) Filed: Oct. 4, 2005

(65) Prior Publication Data
US 2006/0021921 A1 Feb. 2, 2006

Related U.S. Application Data

(63) Continuation of application No. PCT/EP2004/003446, filed on Apr. 1, 2004.

(30) Foreign Application Priority Data
Apr. 4, 2003 (DE) ................ 103 16 173

(51) Int. Cl.
E03F 5/14 (2006.01)
(52) U.S. Cl. .............. 210/158; 210/159; 210/161; 210/394; 210/403; 210/408
(58) Field of Classification Search ..................... None
See application file for complete search history.

(56) References Cited

U.S. PATENT DOCUMENTS 1,594,999 A * 8/1926 Carter ......................... 210/393
2,266,934 A * 12/1941 Tark ............................ 210/772
2,858,942 A * 11/1958 Wenzelberger .............. 210/374
2,929,504 A * 3/1960 Lind et al. ................... 210/158
3,347,379 A * 10/1967 Ronald ........................ 210/127
3,372,810 A * 3/1968 Kletschke .................... 210/210

(Continued)

FOREIGN PATENT DOCUMENTS

DE 1536941 3/1970

(Continued)

Primary Examiner—Robert James Popovics
(74) Attorney, Agent, or Firm—Thomas, Kayden, Horstemeyer & Risley, LLP

(57) ABSTRACT

An apparatus serves for removing fine material to be screened from waste water. The apparatus includes a sieve grate (6) and a detaching device (16). The sieve grate (6) is cylindrical, and it is rotatingly driven. The sieve grate (6) allows for waste water to flow from its interior towards its exterior. The sieve grate (6) includes a supporting body (13) and a mesh sieve (7). The supporting body (13) is located at the exterior of the sieve grate (6). The supporting body (13) is made of a perforated sheet metal including comparatively large openings (37). The supporting body (13) provides for resistance and stability of the sieve grate (6). The mesh sieve (7) is located in the interior of the sieve grate (6). The mesh sieve (7) forms a separation surface (14) for the material to be screened. The mesh sieve (7) includes meshes of a comparatively small size. The mesh sieve (7) is fixedly connected to the supporting body (13). The detaching device (16) is arranged outside of the sieve grate (6). The detaching device (16) includes a plurality of nozzles (22). The nozzles (22) are designed and arranged to spray water from outside of the sieve grate (6) towards the interior of the sieve grate (6) in a way to detach material to be screened adhering to the inner surface of the sieve grate (6).

20 Claims, 9 Drawing Sheets

U.S. PATENT DOCUMENTS

| | | | | |
|---|---|---|---|---|
| 3,527,349 A * | 9/1970 | Lynch | | 210/156 |
| 3,616,932 A * | 11/1971 | Bancroft | | 210/405 |
| 3,739,458 A | 6/1973 | Reedy et al. | | 29/469 |
| 3,747,770 A | 7/1973 | Zentis | | 210/402 |
| 3,779,911 A * | 12/1973 | Freudenthal et al. | | 210/620 |
| 3,865,727 A * | 2/1975 | Broling et al. | | 210/162 |
| 3,936,378 A | 2/1976 | Kawada | | 210/107 |
| 4,009,667 A * | 3/1977 | Tyer et al. | | 110/186 |
| 4,038,187 A * | 7/1977 | Saffran | | 210/108 |
| 4,198,299 A | 4/1980 | Ewing et al. | | 210/77 |
| 4,248,709 A * | 2/1981 | Irving | | 210/769 |
| 4,298,473 A | 11/1981 | Wyman | | 210/213 |
| 4,530,432 A * | 7/1985 | Christian | | 198/662 |
| 4,634,524 A | 1/1987 | Huber | | 210/158 |
| 4,724,077 A * | 2/1988 | Uchiyama | | 210/394 |
| 4,812,231 A * | 3/1989 | Wiesemann | | 210/158 |
| 4,836,919 A | 6/1989 | Huber | | 210/158 |
| 4,859,322 A * | 8/1989 | Huber | | 210/162 |
| 4,929,350 A * | 5/1990 | Wade et al. | | 210/157 |
| 5,006,236 A * | 4/1991 | Croket | | 210/162 |
| 5,008,010 A | 4/1991 | Langner | | 210/232 |
| 5,030,348 A * | 7/1991 | Bengt | | 210/374 |
| 5,061,380 A * | 10/1991 | Stevenson | | 210/768 |
| 5,078,865 A * | 1/1992 | Huber | | 210/162 |
| 5,110,461 A * | 5/1992 | Abel | | 210/158 |
| 5,122,263 A * | 6/1992 | Huber | | 210/110 |
| 5,207,904 A * | 5/1993 | Abel | | 210/252 |
| 5,296,136 A * | 3/1994 | Abel | | 210/158 |
| 5,300,225 A * | 4/1994 | Fischer | | 210/391 |
| 5,341,826 A * | 8/1994 | Huber et al. | | 134/65 |
| 5,372,713 A * | 12/1994 | Huber | | 210/158 |
| 5,398,814 A * | 3/1995 | Sime | | 209/285 |
| 5,399,265 A | 3/1995 | Nehls | | 210/490 |
| 5,433,849 A * | 7/1995 | Zittel | | 210/324 |
| 5,435,917 A * | 7/1995 | Sato | | 210/374 |
| 5,464,542 A | 11/1995 | Grienberger et al. | | 210/784 |
| 5,518,614 A * | 5/1996 | Zittel | | 210/403 |
| 5,552,044 A * | 9/1996 | Abel | | 210/252 |
| 5,558,042 A * | 9/1996 | Bradley et al. | | 119/226 |
| 5,587,073 A * | 12/1996 | Zittel | | 210/372 |
| 5,593,597 A * | 1/1997 | Bischof | | 210/744 |
| 5,595,655 A * | 1/1997 | Steiner et al. | | 210/391 |
| 5,628,912 A * | 5/1997 | Nesseth | | 210/768 |
| 5,641,360 A * | 6/1997 | Bischof | | 134/10 |
| 5,641,398 A * | 6/1997 | Huber et al. | | 210/158 |
| 5,770,094 A * | 6/1998 | Garton et al. | | 210/791 |
| 5,798,038 A * | 8/1998 | Huber | | 210/154 |
| 5,840,180 A * | 11/1998 | Filion | | 210/162 |
| 5,853,585 A * | 12/1998 | Nesseth | | 210/394 |
| 5,950,839 A * | 9/1999 | Wedel | | 209/173 |
| 5,958,500 A * | 9/1999 | Silver | | 426/615 |
| 6,096,201 A * | 8/2000 | Bruke | | 210/155 |
| 6,103,110 A * | 8/2000 | Frommann et al. | | 210/159 |
| 6,136,206 A * | 10/2000 | Butcher et al. | | 210/776 |
| 6,241,902 B1 * | 6/2001 | Huebner | | 210/781 |
| 6,377,013 B2 | 4/2002 | Suzuki | | 318/568.3 |
| 6,395,187 B1 * | 5/2002 | Alanis | | 210/758 |
| 6,451,213 B2 * | 9/2002 | Huebner | | 210/770 |
| 6,572,763 B2 * | 6/2003 | Gorshing | | 210/159 |
| 6,596,166 B1 * | 7/2003 | Danielsson et al. | | 210/324 |
| 7,001,515 B2 * | 2/2006 | Sawhill et al. | | 210/255 |
| 7,037,437 B2 * | 5/2006 | Sawhill et al. | | 210/784 |
| 7,073,433 B2 * | 7/2006 | Burke et al. | | 100/117 |
| 7,160,443 B2 * | 1/2007 | Frommann | | 210/158 |
| 2001/0054591 A1 * | 12/2001 | Gorshing | | 210/769 |
| 2002/0092799 A1 * | 7/2002 | Storruste | | 209/460 |
| 2002/0096460 A1 * | 7/2002 | Ruescher et al. | | 210/154 |
| 2004/0011725 A1 * | 1/2004 | Harle et al. | | 210/350 |
| 2005/0247610 A1 * | 11/2005 | Frommann | | 210/158 |
| 2006/0021921 A1 * | 2/2006 | Frommann | | 210/158 |

FOREIGN PATENT DOCUMENTS

| | | |
|---|---|---|
| DE | 2402871 | 7/1974 |
| DE | 2426024 A1 | 3/1975 |
| DE | 2802066 C2 | 7/1979 |
| DE | 3103968 A1 | 1/1982 |
| DE | 3127570 A1 | 4/1983 |
| DE | 3420157 C1 | 1/1986 |
| DE | 3630755 A1 | 3/1988 |
| DE | 19547585 A1 | 12/1996 |
| DE | 19932416 A1 | 1/2001 |
| EP | 0003327 B1 | 8/1979 |
| EP | 0177451 | 4/1986 |
| EP | 0654294 A2 | 5/1995 |
| EP | 1297878 | 4/2003 |
| GB | 1131194 | 10/1968 |
| GB | 1469310 | 4/1977 |
| GB | 2103504 | 2/1983 |

* cited by examiner

APPARATUS FOR REMOVING FINE MATERIAL FROM A LIQUID

CROSS REFERENCE TO RELATED APPLICATIONS

This application is a continuation of International Application PCT/EP2004/003446 entitled "Device for removing fine screened material from a liquid" with an international filing date of Apr. 1, 2004 and claiming priority to co-pending German Patent Application No. DE 103 16 173.2 entitled "Vorrichtung zum Entfernen von feinem Siebgut aus einer Flüssigkeit", filed on Apr. 4, 2003.

FIELD OF THE INVENTION

The present invention generally relates to an apparatus for removing fine material to be screened from a liquid. More particularly, the material to be screened is mud or sludge and the liquid is waste water. The apparatus includes a rotatingly driven cylindrical sieve grate through which waste water flows from the inside towards the outside. The apparatus also includes a detaching device arranged outside of the sieve grate. The detaching device includes nozzles from which spraying water is sprayed from the outside towards the inside to detach material to be screened adhering to the inner surface of the sieve grate.

When treating waste waters in sewage treatment plants, it is desired to tread mud or sludge which includes a comparatively great portion of water in a way that the mud content is increased in one portion and the water content is increased in the other portion. In other words, it is desired to separate the mud from its liquid components in an effective way.

BACKGROUND OF THE INVENTION

An apparatus for removing fine material to be screened from a liquid is known from German Patent No. DE 34 20 157 C1 corresponding to U.S. Pat. No. 4,634,524. The known apparatus includes a cylindrical sieve grate. The sieve grate with its axis is submerged in an inclined manner in the channel though which the liquid flows. The sieve grate is designed to be hydraulically opened at its inflow side and to be substantially hydraulically closed at its outflow side. The sieve grate includes a perforation of slits forming a separation surface at the inner side, while the liquid passes through the slits and remains in the channel. The cylindrical sieve grate is rotatingly driven in connection with a screw conveyor. The screw conveyor begins with a feeding hopper being coaxially arranged and supported in the region of the sieve grate in a stationary manner. The screw conveyor includes a housing and a conveying screw. A stationary detaching device designed as a brush roll or a spray rail is arranged at the outer side of the sieve grate and above the feeding hopper. The detaching device serves to detach the material to be raked and/or to be screened which adheres to the inner surface of the sieve grate. The material is detached from the outside. The screenings or rakings fall down in the feeding hopper which is the first element of the screw conveyor. The screenings or rakings are then upwardly conveyed to a discharge location located outside of the liquid. The cylindrical sieve at its inner side grate includes guiding plates being arranged in a spiral configuration. The guiding plates have the function of conveying pieces of rakings (especially bigger ones) in an upward direction during rotation of the sieve grate and of preventing them from falling back during rotation of the sieve grate. The openings of the perforation of the sieve grate may be designed to have a size from between a plurality of millimetres to approximately 10 mm. Smaller openings cannot be produced in an economic way. Consequently, the known apparatus cannot be used for treating sludge-like screenings.

A rotating filter is known from German Patent Application No. DE 24 26 024 A1 corresponding to British patent No. 1 469 310. The known rotating filter serves to clear liquids from mud in an automatic and continuous way, the liquids containing impurities. A rotatingly driven cylindrical sieve grate designed as a filtering drum is used. The filtering drum includes two disc-like faces between which a sieve is tightened. The two faces are maintained at a distance with respect to one another by bars. Preferably, the sieve is freely tightened to the disc-like faces by elastic supporting rings such that it may be easily replaced. However, the sieve may also be connected to the faces at its circumference by fixing brackets or by other devices. The apparatus is arranged in a way that its axis is located in a horizontal direction, and it includes a feeding hopper and a screw conveyor for discharging the screenings in an axial direction.

A sieve grate having a three-part design is known from U.S. Pat. No. 3,747,770 and U.S. Pat. No. 5,399,265. The known sieve grate at the inside includes a mesh sieve having small meshes. The mesh sieve contacts a grid having large openings. As the third part of the sieve grate, a drum is arranged at the outside. The drum provides for stability and resistance, and it is made of a respective number of transverse bars and circumferential elements. The mesh sieve is connected to the grid construction by a sintering process such that a majority of contact points between these two elements is realized.

A rotating filter for separating solid materials from a liquid is known from German Patent Application No. DE 24 02 871 corresponding to U.S. Pat. No. 3,936,378. The known rotating filter has an octangular box-like design over the outside of which a filtering net is tightened. The liquid containing the screenings flows through the filtering net from the inside towards the outside such that the screenings are deposited at the inner side of the filtering net. A detaching apparatus is arranged outside of the filtering net. The detaching apparatus operates with compressed air to eject the screenings into a feeding hopper of a conveyer screw and to discharge the screenings from the region of the sieve drum in an axial way.

SUMMARY OF THE INVENTION

The present invention relates to an apparatus for removing fine material to be screened from a liquid or a fluid, especially waste water. The apparatus includes a sieve grate and a detaching device. The sieve grate is designed to be cylindrical. The sieve grate has an inner surface, an interior and an exterior. The sieve grate is designed and arranged to be rotatingly driven. The sieve grate is designed and arranged such that waste water can flow from the interior towards the exterior of the sieve grate. The sieve grate includes a supporting body and a mesh sieve. The supporting body is located at the exterior of the sieve grate. The supporting body is made of a perforated sheet metal including comparatively large openings. The supporting body is designed and arranged to provide resistance and stability to the sieve grate. The mesh sieve is located in the interior of the sieve grate. The mesh sieve is designed and arranged to form a separation surface. The mesh sieve includes meshes of a comparatively small size. The mesh sieve is fixedly connected to the supporting body. The detaching device is arranged outside of the sieve grate. The detaching device includes a plurality of nozzles. The nozzles are designed and arranged to spray water from outside of the sieve grate towards the interior of the sieve grate in a way to detach material to be screened adhering to the inner surface of the sieve grate.

The novel apparatus is capable of effectively removing mud-like material to be screened from a liquid. It is also possible to remove fibrous materials and other small screenings as well as particulate material, meaning rakings and the like.

The sieve grate is made of two substantial elements, namely a supporting body and a mesh sieve. The supporting body is made of sheet metal as a perforated plate including comparatively large openings. By the large openings, it is intended to realize a preferably large free surface through which liquid may flow though the openings. On the other hand, it is intended to design the sieve grate in a way that it has the required stiffness and stability. The actual separation surface for separating the screenings from the liquid is formed by the second component of the sieve grate, namely the mesh sieve. The mesh sieve has comparatively small meshes. In other words, the openings are small. The mesh sieve is arranged inside of the (hollow cylindrical) sieve grate and of its perforated cylindrical plate, respectively. Such a mesh sieve only has limited stability. It is fixedly connected to the supporting body at spaced apart points only or in certain spaced apart regions, meaning it is supported and held by the supporting body, but it is not entirely connected to it. Due to the associated direction of flow from the inside towards the outside of the sieve grate, the mesh sieve is supported by and pressed against the supporting body. Only some portions of the mesh sieve corresponding to the size of the individual large openings are arranged in an unsupported free way. In this way, the sieve grate substantially attains the desired hollow cylindrical shape.

The supporting body made of sheet metal may include punched large openings, and it may be formed starting from a plate shape to then reach the cylindrical shape. It is also possible to attain the supporting body being made of sheet metal by using a plurality of sections, meaning portions forming the cylinder when assembled. Especially, it is possible to use a semi-shell design or to interconnect three thirds, for example.

The screenings being deposited at the inner surface of the mesh sieve are upwardly conveyed by the driven sieve grate, and they are moved out off the liquid in this way. A detaching device including spray nozzles is located at the outside of the sieve grate and outside of the liquid. The screenings adhering to the inner surface of the mesh sieve are detached by the detaching device which sprays water through the large openings of the supporting body (and though the mesh sieve) onto the screenings. The screenings are then removed from the region of the sieve grate by a conveying apparatus.

The apparatus may be introduced into a channel through which waste water flows. In this case, the apparatus is arranged such that its axis is inclined. In this case, a conveying apparatus is required to remove the deposited screenings from the channel. However, it is also possible to arrange the apparatus such that its axis is horizontal. In such a case, a container is used, the container including an exit for the liquid. The screenings are conveyed in an axial direction by additional elements of the sieve grate, and they exit the apparatus in an axial direction.

The surface portion of the large openings of the supporting body preferably is approximately between 70% and 90% such that the perforated plate with its bars has a surface portion of approximately between 30% and 10%. It is to be understood that the bars are interconnected in a way that they form the openings therebetween. This kind of dimensioning desires to make sure that the perforated plate provides for the stability of the sieve grate, while the mesh size of the mesh sieve may be chosen in accordance with the respective case of application. The novel sieve grate is a dimensionally stable unit having a long lifetime. For example, the mesh sieve and the perforated plate may be made of stainless steel.

The large openings of the supporting body may have a rectangular shape, a square shape, a rounded shape or a different appropriate shape. The shape and arrangement is coordinated in a way that one attains small portions of the mesh sieve in which the screenings are deposited, the portions operating in an independent way. In this way, undesired substantial sagging of the mesh sieve is prevented. The fulling movement occurring in the regions of the mesh sieve between the depositing position below the water level and the detaching position above the water level are kept low in an advantageous way.

The mesh sieve may have a mesh size of approximately between 0.1 to 1.0 mm, and it may be thus adapt to the different cases of application in a variable way even when not changing the design of the perforated plate.

In case the apparatus is used in combination with a channel through which liquid flows, the sieve grate is arranged in the channel such that its axis is arranged in an inclined way. In this case, the apparatus includes a conveying apparatus including a driven conveyor screw. The conveying apparatus leads to a discharge location being located outside of the liquid. A feeding hopper is arranged in the region of the sieve grate, the conveying apparatus being connected to the feeding hopper such that the conveying apparatus with its conveyor screw picks up the deposited screenings. The screenings are dewatered and removed from the channel in an upwardly inclined direction.

Scooping elements serving to convey the fine screenings in an upward direction may be arranged at the inner circumferential surface of the sieve grate. These scooping elements have a tub-like or chamber-like shape. They are partly opened to allow for the liquid exiting during the upward movement such that the concentration of the mud contained in the scooping elements is increased.

However, it is also possible to arrange the apparatus outside of a channel and to operate it in a container, for example. The sieve grate then is arranged in the container at a horizontal orientation. Its axis is arranged to be horizontal. Again, it is possible to use a conveying apparatus including a conveyor screw and a feeding hopper. Another possibility is to arrange a guiding and conveying helix at the inner circumferential surface of the mesh sieve of the sieve grate such that the deposited screenings are conveyed through the sieve grate in an axial direction, and they exit the sieve grate at the end facing away from the entrance.

In case a feeding hopper including a conveying apparatus and a conveyor screw being located downstream is used, the bottom of the feeding hopper is designed to include slits to allow for passage of liquid through this region and to attain increased concentration of the fine screenings in the feeding hopper.

The fixed connection between the mesh sieve and the supporting body preferably is realized by spot welding. In this way, the mesh sieve is connected to the supporting body in an immobile way, and one attains the sieve grate as a fixed unit. The large openings of the perforated plate as well as the small openings of the mesh sieve are coordinated and adapted to the respective case of application.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
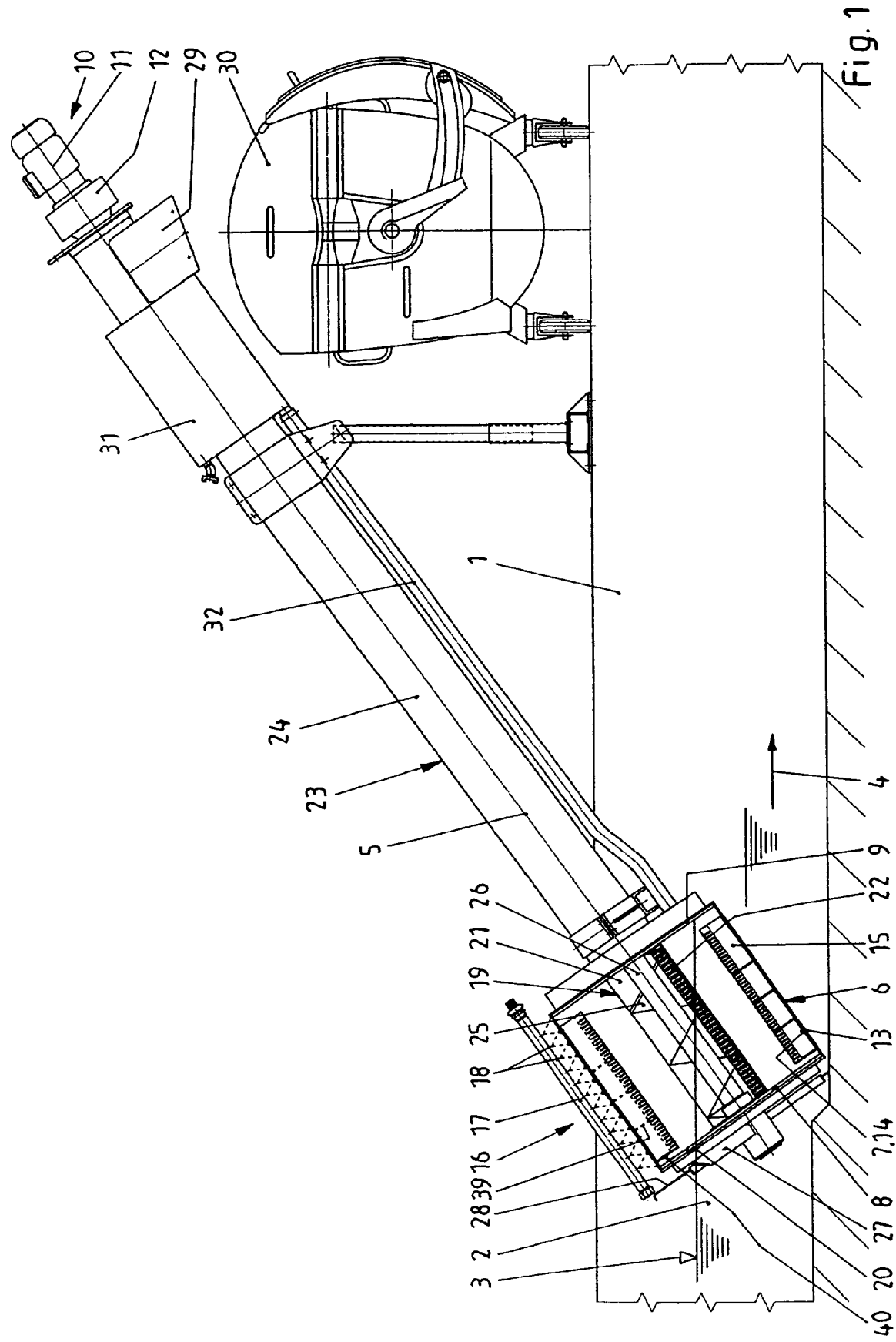
FIG. 1 schematically illustrates a side view of the novel apparatus arranged in a channel.

Referring now in greater detail to the drawings, FIG. 1 illustrates an exemplary embodiment of the novel apparatus and a channel 1 in which liquid 2 being polluted with material to be screened flows in the direction of arrow 4. The liquid 2 has a water level 3. The apparatus with its axis 5 is arranged in an inclined way in the channel 1. Preferably, the angle of inclination is approximately 35°.

The apparatus includes a cylindrical sieve grate 6. An important element of the sieve grate 6 is a mesh sieve 7 which may be designed as a mesh fabric. The sieve grate 6 at its inflow side has an opened face 8 through which the polluted liquid 2 including material to be screened flows into the interior of the sieve grate 6. A sealed face 9 being hydraulically closed in this way is arranged at the outflow side or the exit side. The sieve grate 6 is rotatingly supported in the region of the face 9, and it is sealed with respect to stationary elements. The sieve grate 6 is driven to rotate about its axis 5. Especially, the drive is realized in a discontinuous way such that standstill periods follow rotating periods an vice versa. A motor 11 serves as the drive 10. The drive 10 may further include a transmission 12.

In addition to the mesh sieve 7, the sieve grate 6 includes a supporting body 13 as a supporting element which guarantees the shape. The supporting body 13 is designed as a perforated plate of sheet metal which may be produced in a simple way at low costs. The supporting body 13 at its inner side contacts and supports the mesh sieve 7. The supporting body 13 and the mesh sieve 7 may both be made of stainless steel. They both may be adapted to the respective case of application in an optimal way. The supporting body 13 includes large openings and a low portion of bars. The mesh sieve 7 is especially designed as a square mesh sieve, and it has small openings. The supporting body 13 serves to permanently determine and maintain the cylindrical shape of the sieve grate 6 and to accept the respective forces. The mesh sieve 7 with its inner cylindrical surface forms a separation surface 14. The separation surface 14 is further formed by guiding plates 15. The guiding plates 15 may be arranged to be parallel to the axis 5 of the apparatus and to a surface line of the cylindrical sieve grate 6, respectively. The guiding plates 15 are connected to the separation surface 14 in a sealed way, and they are divided by separating walls 39. They are designed to be closed by an end wall 40 at least at one end. The conveying tubs formed in this way are commonly rotated with the sieve grate 6, and they thus form tub-like chambers or scooping elements. These chambers or elements during rotation move from below the water level 3 in an upward direction outside of the water level 3, and they serve to convey the screening in an upward direction.

A detaching device 16 is arranged above the water level 3 and above the sieve grate 6. The detaching device 16 includes a spray rail 17 including nozzles 18. By means of the detaching device 16, spraying water is sprayed from the outside through openings of the supporting body 13 and through the openings located in the mesh sieve 7 such that screenings deposited at the inner circumference of the mesh sieve 7 are detached therefrom. The detached screenings then enter a feeding hopper 19 due to gravity and due to the forces applied by the spraying water, respectively. The feeding hopper 19 is arranged to be parallel to the axis 5 of the apparatus in a stationary way. Preferably, it is arranged in a concentric way in the region of the sieve grate 6. The detaching device 16 may be designed to operate with a cleaning medium such as spraying water and/or compressed air. The feeding hopper 19 includes an upwardly protruding funnel wall 20 and side walls 21 being associated with the opened face 8 of the sieve grate 6. Openings 22 are located in the bottom portion of the feeding hopper 19. The openings 22 may be designed as bores having a diameter of up to approximately 2 mm. A screw conveyor unit 23 is arranged in a coaxial way to the axis 5 of the apparatus and thus to the sieve grate 6. The screw conveyor 23 includes a housing 24 and a conveyor screw 25 being located in the housing 24. A continuous shaft 26 carrying the conveyor screw 25 extends from the motor 11 and from the transmission 12, respectively, through the entire housing 24. In the region of the sieve grate 6, it protrudes with respect to the housing 24 in an axial direction. In this region, the conveyor screw 25 cooperates with the feeding hopper 19. At this place, the conveyor screw 25 may include brush elements slightly touching the perforated bottom wall of the feeding hopper 19 to repeatedly clean and expose the openings 22. For reasons of simplicity of the drawings, the brush elements are not illustrated.

The motor 11 drives the conveying screw 25 of the screw conveyor unit 23 by the shaft 26. At the same time, the motor 11 serves to rotatingly drive the sieve grate 6. For this purpose, there may be a drive arm 27 being fixedly connected to the shaft 26 as well as to the sieve grate 6 and especially to its supporting element 13 to be commonly rotated therewith. The intermediate space between the sieve grate 6 and the walls of the channel 1 is sealed by a plank plate 28 such that the polluted liquid is forced to flow through the opened face 8 into the interior of the cylindrical sieve grate 6. Thus, the liquid flows through openings located in the mesh sieve 7, and it remains located in the channel 1 while the material to be screened deposits on the inner surface of the mesh sieve 7. During the rotating movement of the sieve grate 6, the material to be screened is conveyed in an upward direction. After discharging the screenings by the detaching device 16, the screenings reach the region of the feeding hopper 19 and thus the region in which the screw conveyor unit 26 is active. The screenings are conveyed in an upward direction, and they are dumped in a container 30, for example, via a discharge location 29. A pressing zone 31 may be arranged in the upper region of the screw conveyor unit 23. The screenings conveyed in an upward direction are further dewatered in the pressing zone 31 before the screenings reach the discharge location 29. A conduit 32 serves to return liquid deposited in the pressing zone 31 into the channel 1.

Figure 2:
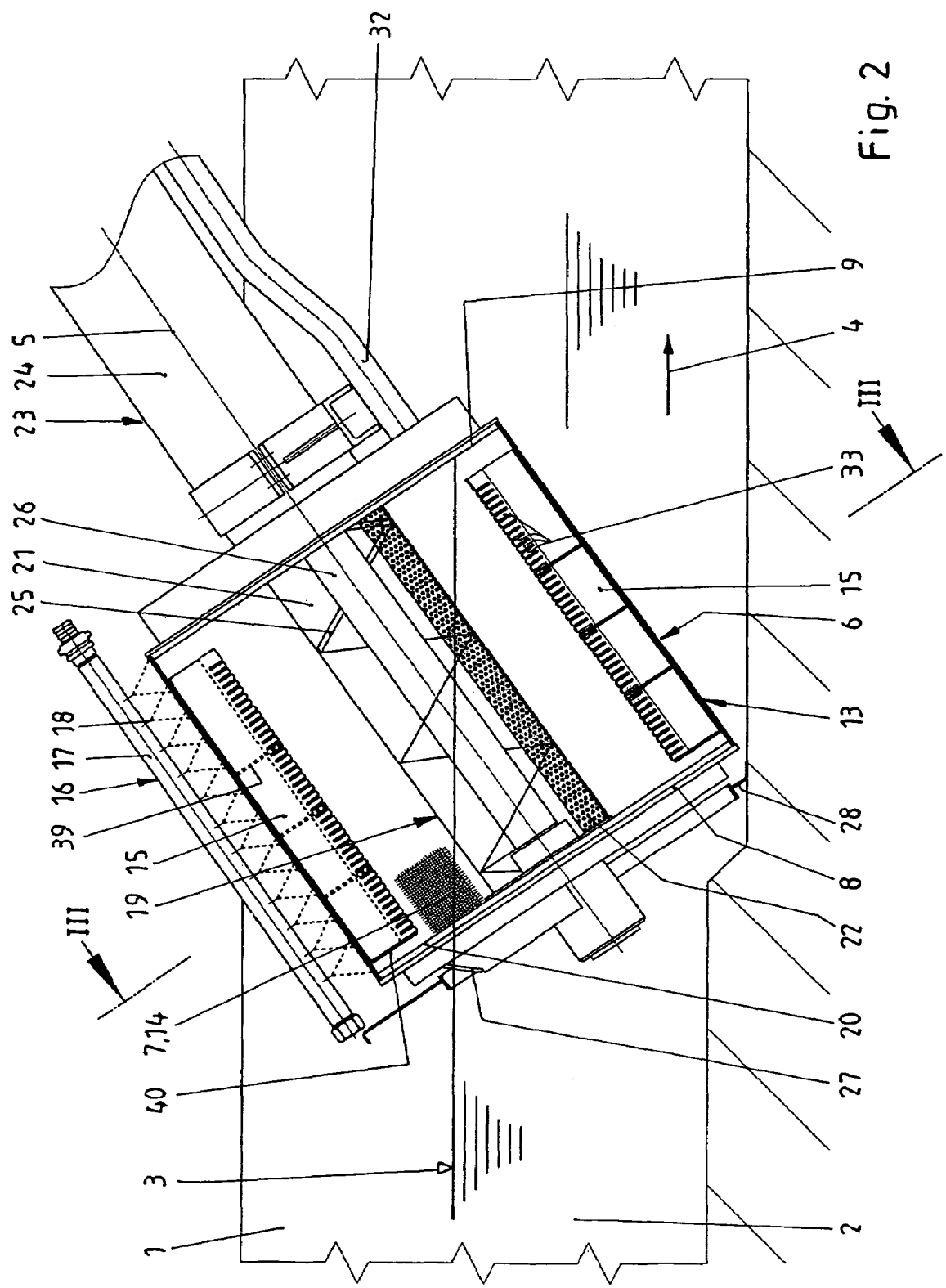
FIG. 2 is an enlarged illustration of details of the novel apparatus in the region of the driven sieve grate.

FIG. 2 further illustrates the design of the novel apparatus in the region of the sieve grate 6 at an enlarged scale. A section of the inner circumference of the sieve grate 6 is illustrated. The mesh sieve 7 contacts the supporting body 13, the mesh sieve 7 forming the separation surface 14. It is also to be seen that the guiding plates 15 extend parallel to the axis 5 such that they are inclined against the separation 14 of the mesh sieve 7 in this way. The guiding plates 15 at their free side facing away from the separation surface 14 include openings 33. In this example, the openings 33 are designed in a comb-like way. However, these openings 33 may also be realized as bores being located in this region of the guiding plates 15. In this way, during the upward movement of the screenings in the tub-like chambers, the screenings are permanently dewatered by the liquid level in the chambers changing and liquid passing through the comb-like openings 33 or the bores into the channel 1.

Figure 3:
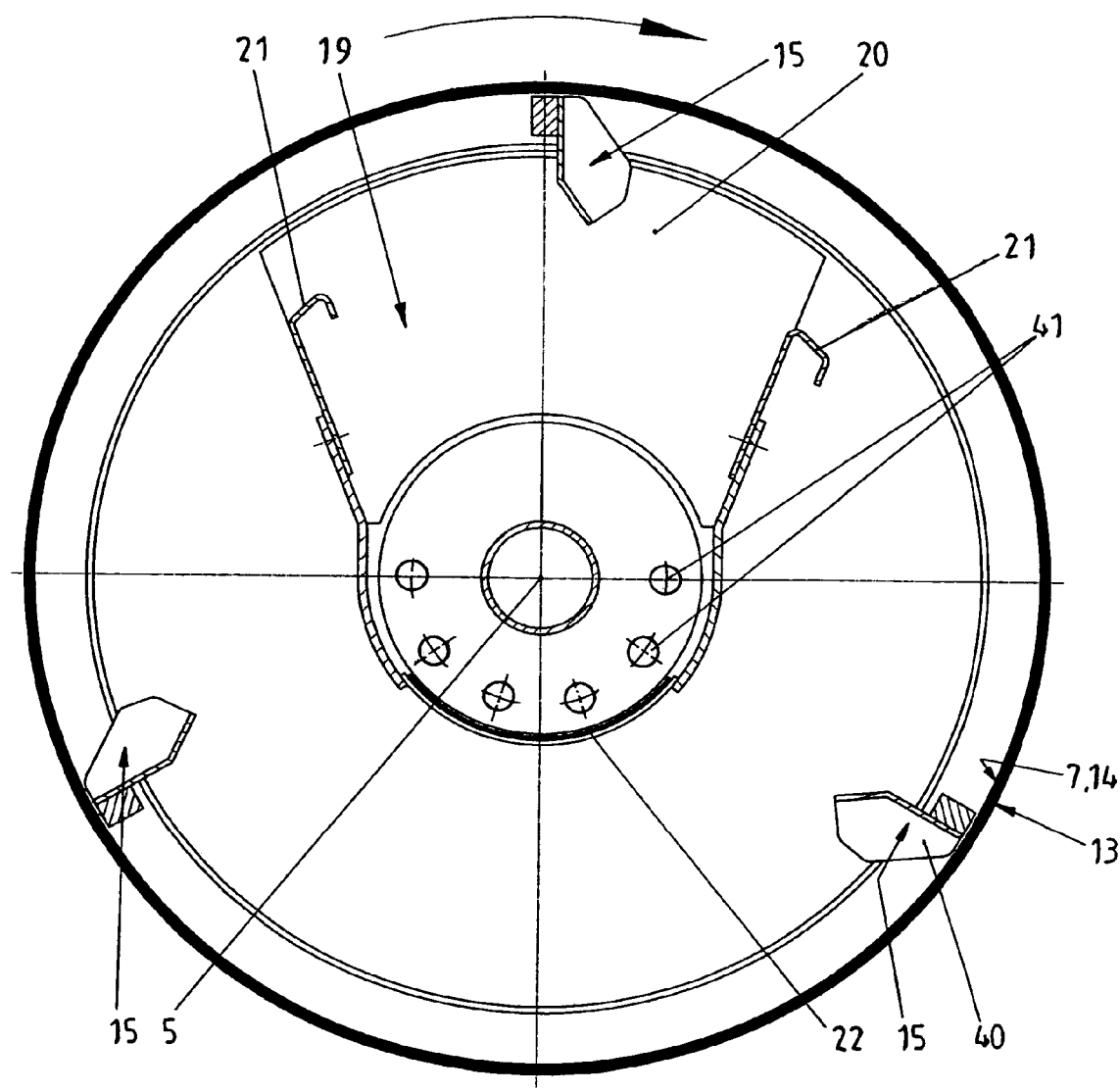
FIG. 3 illustrates a section through line III-III in FIG. 2.

FIG. 3 illustrates a sectional view of the novel apparatus according to line III-III in FIG. 2. The feeding hopper 19 is well visible in this view. The feeding hopper 19 includes the funnel wall 21 which may include openings 41 being located in its lower portion. The openings 41 may be located in the bottom of the feeding hopper 19 in addition to the openings 22. It may make sense to design the openings 41 to have a greater diameter than the openings 22 being located in the bottom region. The openings 41 are not necessarily required. Furthermore, one can see the arrangement of three guiding plates 15 being designed as straight pieces and being arranged to be parallel to the axis of the apparatus.

Figure 4:
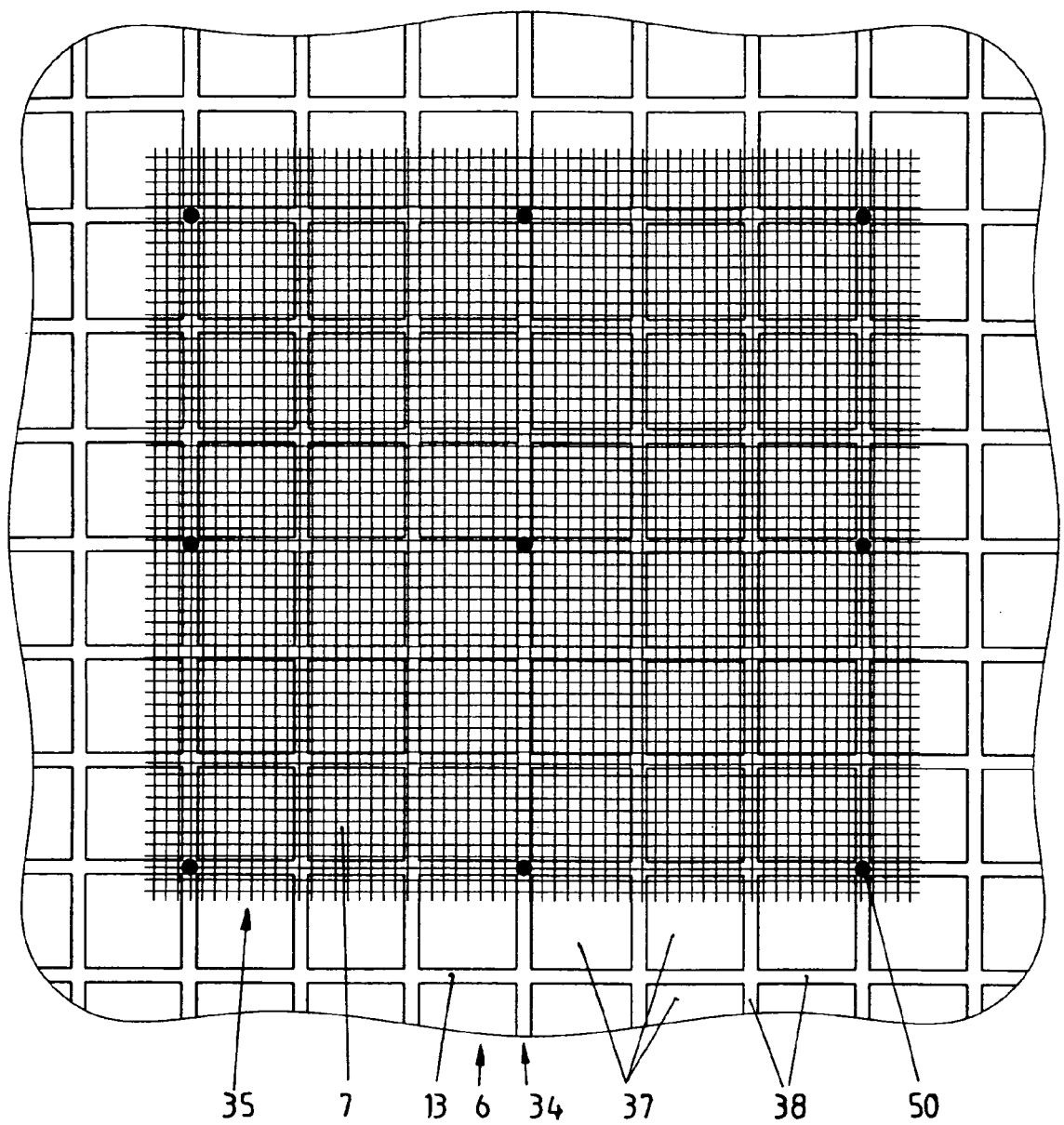
FIG. 4 is a top view from the inside on the (cylindrical) structure of the sieve grate as wound down into a plane.

FIG. 4 further illustrates the mesh sieve 7 and the supporting body 13 which serves as the carrying element at an enlarged scale. In this case, the mesh sieve 7 is designed as a square mesh fabric 35. The supporting body 13 is designed as a perforated plate 34 which is designed to define the shape and which thus is comparatively stiff. Consequently, if it is bent to be cylindrical, it maintains its shape and provides for stability of the sieve grate 6. The perforated plate 34 includes large openings 35 and bars 38. The square mesh fabric 35 has a mesh size 36 which may be in a range of approximately between 0.1 and 1.0 mm depending on the case of application. The inside of the square mesh fabric 35 forms the separating surface 14. Welding points 50 indicate that the mesh sieve 7 and the supporting body 13 are fixedly connected.

Figure 5:
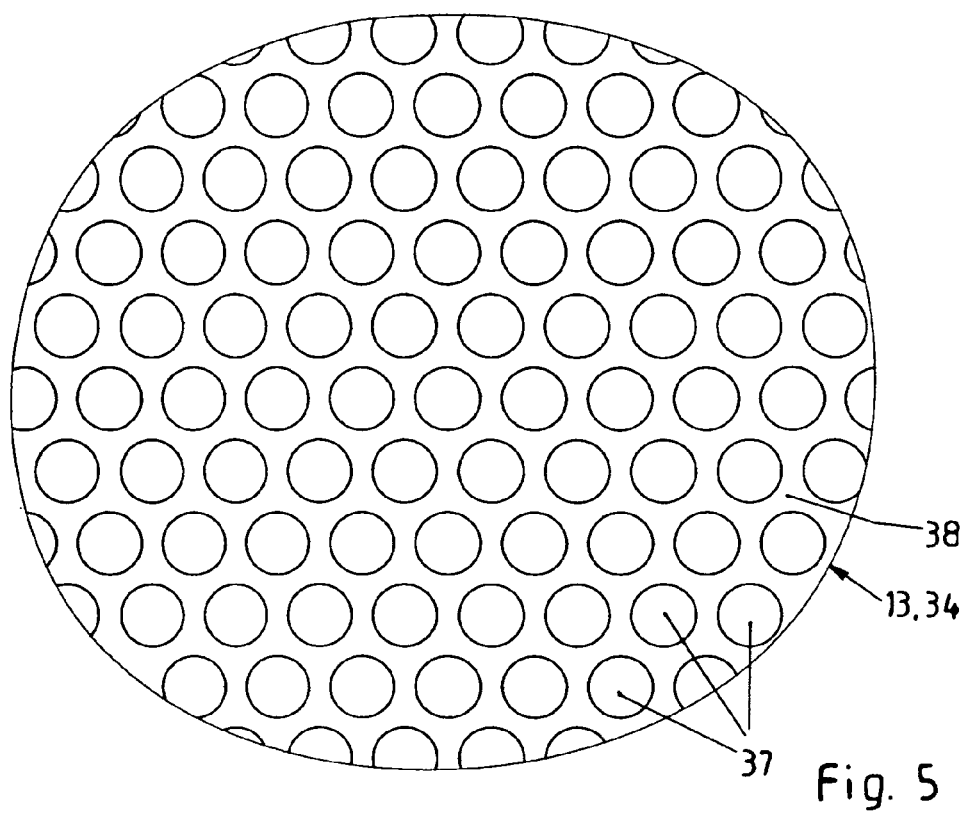
FIG. 5 is a top view of the supporting body including circular openings.
Figure 6:
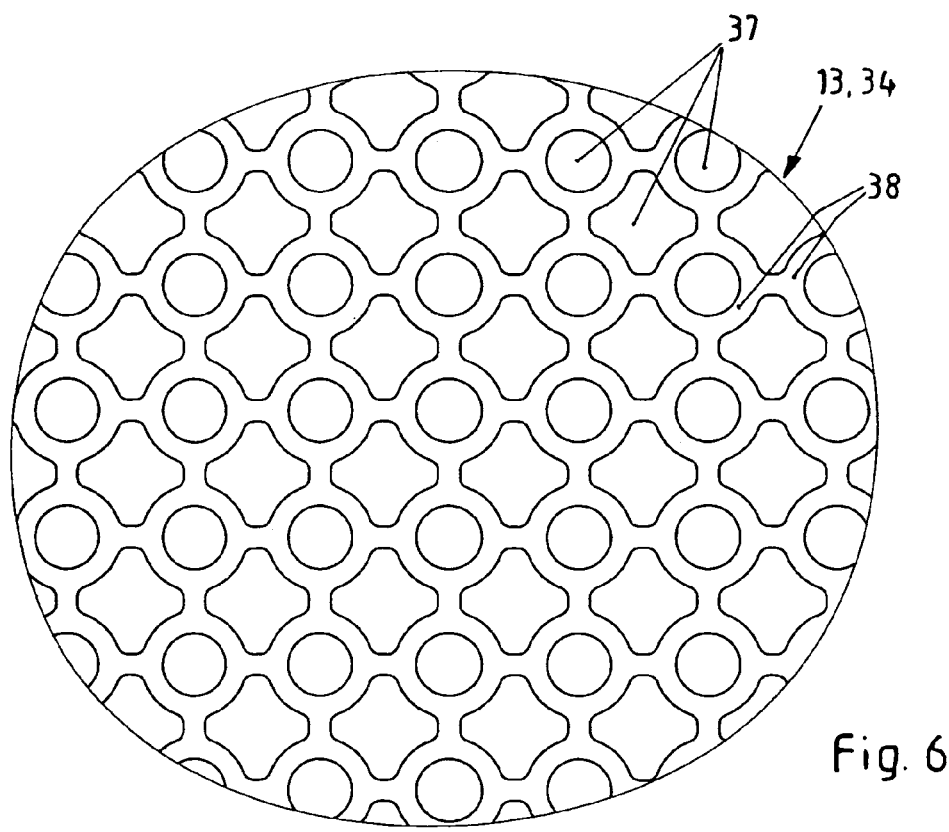
FIG. 6 is a top view of another embodiment of the supporting body and of the perforated plate.

FIGS. 5 and 6 illustrate two additional exemplary embodiments of the supporting body 13 and of the perforated plate 34, respectively. According to FIG. 5, the large openings 37 are designed as circular holes. FIG. 6 illustrates another embodiment in which two different kinds of large openings 37 are formed between the bars 38. Further designs are imaginable and may be used. The large openings 37 are especially produced by punching. Their share of the surface is preferably chosen to be great, for example in a range of approximately between 80 to 90%. The bars 38 are designed in a way that their share of the surface is respectively small such that only a respective small surface does not allow for passage of liquid. The supporting body 13 serves to provide for stability of the sieve grate 6.

Figure 7:
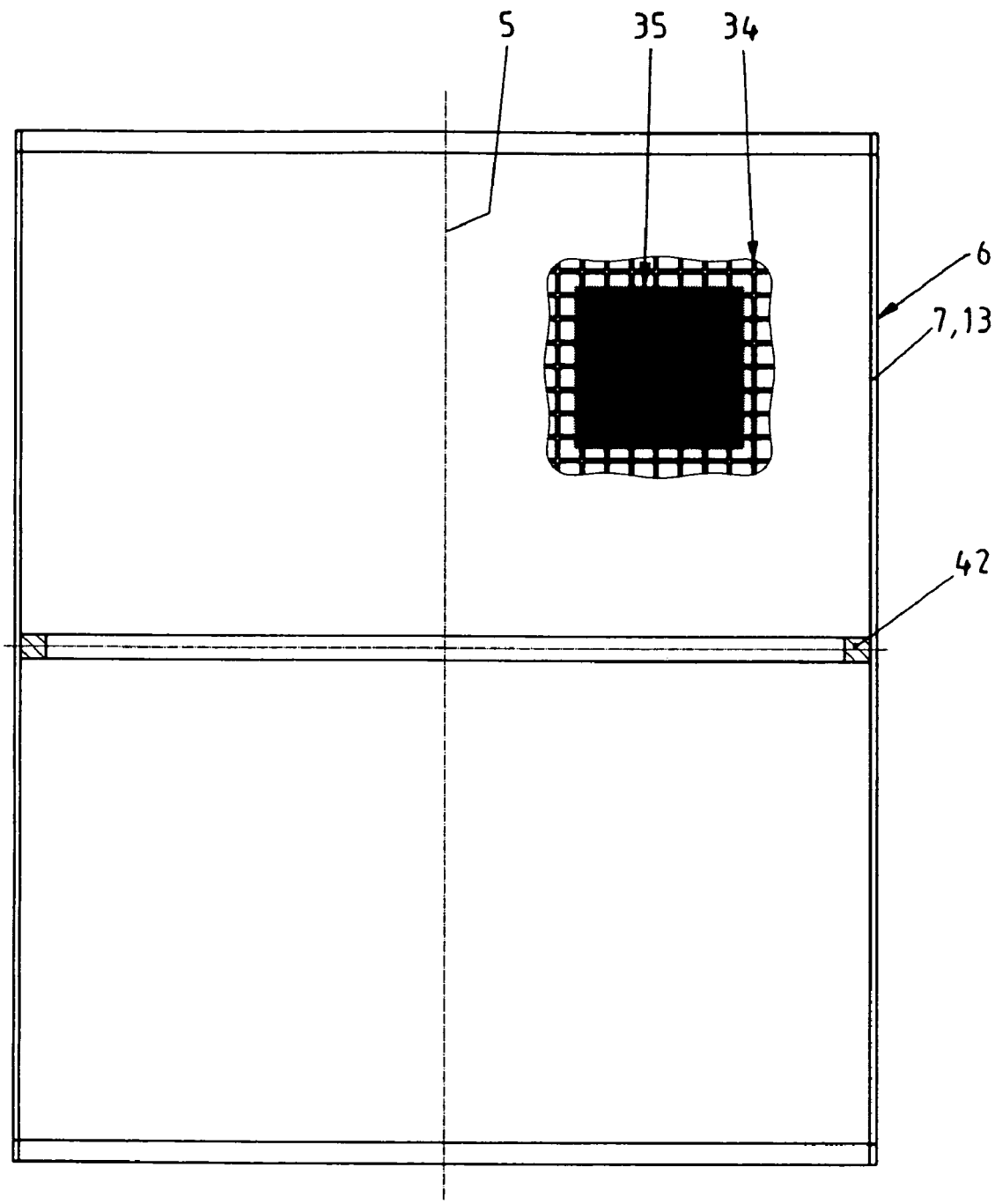
FIG. 7 is a view of a sieve grate including a supporting ring.

FIG. 7 illustrates a sieve grate 6 with its mesh sieve 7 being located at the inside and its supporting body 13 being located at the outside with respect to the axis 5. At a part of its circumference, the square mesh fabric 35 and the perforated plate 34 are indicated. The illustrated embodiment of the sieve grate 6 has a comparatively great diameter and a great length. To increase stiffness and stability of the sieve grate 6, a supporting ring 42 is indicated, the supporting ring 42 contacting the mesh sieve 7 from the inside. It is to be understood that it is also possible to arrange a plurality of such supporting rings 42 along the axial length.

Figure 8:
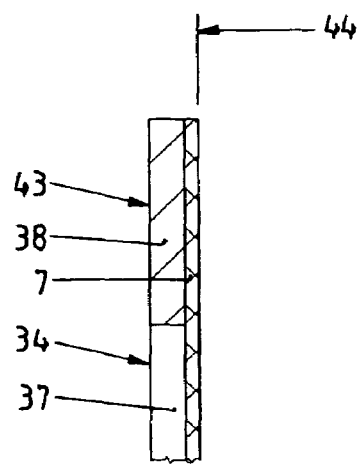
FIG. 8 is a view illustrating a sieve grate including a plurality of cylindrical portions.
Figure 8:
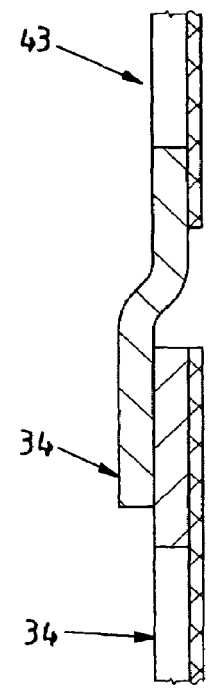
Figure 8:
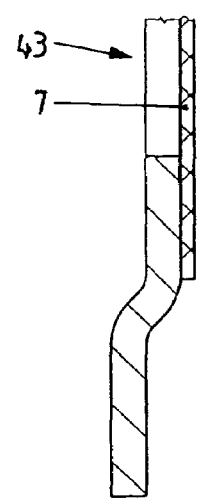

It is to be especially seen in FIG. 8 that the sieve grate 6 may include a plurality of cylindrical sections 43 being interconnected in an axial direction. To emphasize this, an inner diameter 44 is indicated. It is easily imaginable that the sieve grate 6 may also be designed to be divided in the other direction, meaning in the circumferential direction of the sieve grate 6. In this case, semi-shells each including semi-shell-shaped perforated plates 34 may be interconnected, for example. Furthermore, parts of the mesh sieve 7 may be associated. It is also possible to introduce a common cylindrical mesh sieve 7 into a supporting body 13 being made of interconnected semi-shells or even more additional parts.

Figure 9:
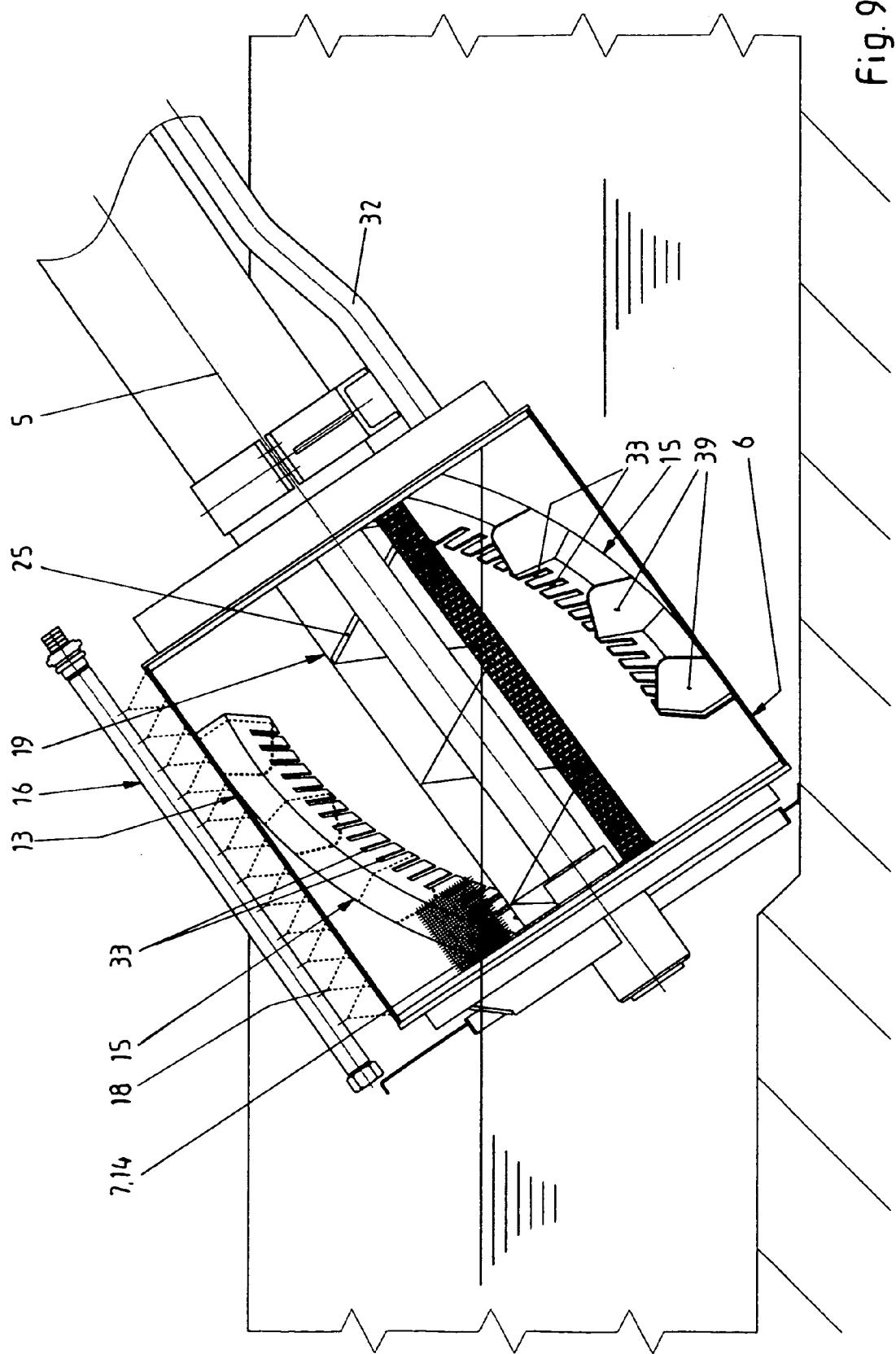
FIG. 9 is a view similar to FIG. 2, but showing a different embodiment of the novel apparatus.

FIG. 9 illustrates an embodiment of the novel apparatus which widely corresponds to the embodiment of FIG. 1. In the contrary to FIG. 1, the guiding plates 15 located at the inside of the mesh sieve 7 are designed and arranged in a spiral-like configuration. The separating walls 39 are easily visible as well as the comb-like openings 33 such that one can see separate tub-like scooping elements which transport screenings in an upward direction during rotation of the sieve grate 6.

Figure 10:
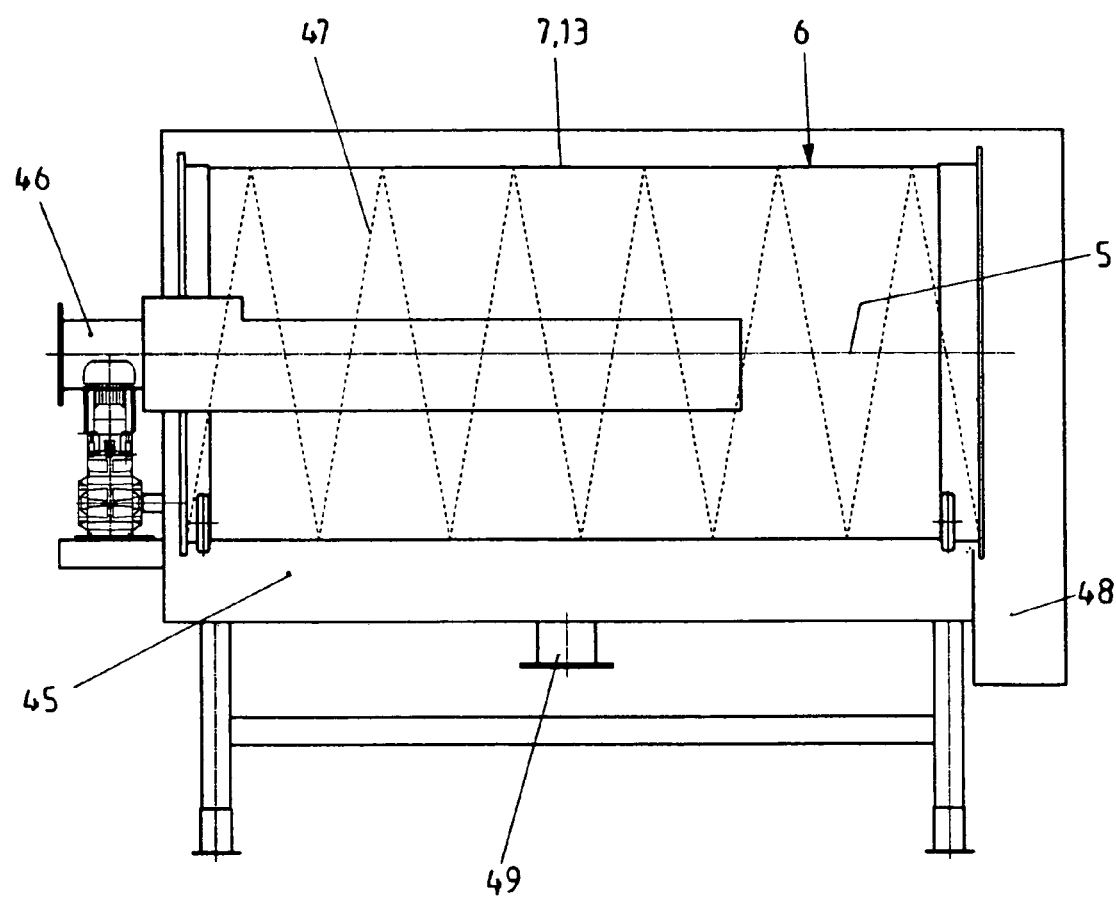
FIG. 10 is a schematic side view of the novel apparatus with its axis being arranged to be horizontal.

FIG. 10 finally illustrates another exemplary embodiment of the novel apparatus which is used outside of a channel such that its axis 5 is approximately horizontal. The sieve grate 6 is arranged and supported in a container 45, and it is also driven to rotate therein. The sieve grate 6 in accordance with the above described exemplary embodiments includes a mesh sieve 7 being located at the inside and a supporting body 13 being located at the outside. The supply of liquid 2 including material to be screened into the interior of the sieve grate 6 is realized via an inlet 46. The sieve grate 6 at its inside includes a conveying helix 47 extending along the length of the sieve grate 6. In this way, the sieve grate 6 during its rotation also realizes a conveying component of movement directed in a horizontal direction towards the discharge 48. The enriched mud (meaning the mud containing less water) is discharged at the discharge 48 while the liquid passes beyond an outflow 49. The exemplary embodiment of the novel apparatus illustrated in FIG. 10 does not include a screw conveyor unit 23. It is to be understood that it is possible to arrange such a conveyor screw unit 23 also in case of an arrangement with a horizontal axis 5. In other words, the apparatus illustrated in FIG. 1 may either be arranged to be inclined or to be horizontal. The apparatus according to FIG. 10 also includes a detaching device (not illustrated).

Many variations and modifications may be made to the preferred embodiments of the invention without departing substantially from the spirit and principles of the invention. All such modifications and variations are intended to be included herein within the scope of the present invention, as defined by the following claims.

I claim:

1. An apparatus for removing fine material to be screened from waste water, comprising:
   a sieve grate,
      said sieve grate being designed to be cylindrical,
      said sieve grate having an inner surface, an interior and an exterior,
      said sieve grate being designed and arranged to be rotatingly driven,
      said sieve grate being designed and arranged such that waste water can flow from the interior towards the exterior of said sieve grate,
      said sieve grate including a supporting body and a mesh sieve,
      said supporting body being located at the exterior of said sieve grate,
      said supporting body being made of a perforated sheet metal including comparatively large openings,
      said supporting body being designed and arranged to provide resistance and stability to said sieve grate,
      said mesh sieve being located in the interior of said sieve grate,
      said mesh sieve being designed and arranged to form a separation surface,
      said mesh sieve including meshes of a comparatively small size, and
      said mesh sieve being fixedly connected to said supporting body; and
   a detaching device,
      said detaching device being arranged outside of said sieve grate,
      said detaching device including a plurality of nozzles, said nozzles being designed and arranged to spray water from outside of said sieve grate towards the interior of said sieve grate in a way to detach material to be screened adhering to the inner surface of said sieve grate.

2. The apparatus of claim 1, wherein said sieve grate substantially only consists of said supporting body and said mesh sieve.

3. The apparatus of claim 1, wherein said mesh sieve is fixedly connected to said supporting body at spaced apart points.

4. The apparatus of claim 1, wherein said mesh sieve is fixedly connected to said supporting body in spaced apart regions.

5. The apparatus of claim 1, wherein said supporting body includes comparatively large openings being surrounded by bars, said openings having a surface portion of approximately between 70% and 90% and said bars having a surface portion of approximately between 30% and 10%.

6. The apparatus of claim 1, wherein said openings of said supporting body have a rectangular shape.

7. The apparatus of claim 1, wherein said openings of said supporting body have a square shape.

8. The apparatus of claim 1, wherein said openings of said supporting body have a rounded shape.

9. The apparatus of claim 1, wherein said mesh sieve has a mesh size of approximately between 0.1 and 1.0 mm.

10. The apparatus of claim 1, wherein
   said sieve grate has an axis, said sieve grate being designed to be arranged in a channel through which waste water flows such that the axis is arranged at an inclined orientation in the channel, and
   the apparatus further includes a feeding hopper and a screw conveyor unit including a driven conveyor screw, said screw conveyor unit leading to a discharge location located outside of the waste water, said feeding hopper being arranged in the region of said sieve grate, said feeding hopper being connected to said screw conveyor unit.

11. The apparatus of claim 10, wherein said sieve grate includes a plurality of scooping elements, said scooping elements being arranged at the inner surface of said sieve grate, said scooping elements being designed and arranged to convey the fine material to be screened in an upward direction.

12. The apparatus of claim 11, wherein said scooping elements include a plurality of slit-like openings.

13. The apparatus of claim 10, wherein said feeding hopper has a bottom, said bottom including a plurality of slits.

14. The apparatus of claim 1, wherein
   said sieve grate has an axis, said sieve grate being designed to be arranged such that the axis is arranged at a horizontal orientation, and
   said sieve grate includes a guiding and conveying helix, said guiding and conveying helix being designed and arranged to convey the fine material to be screened in a horizontal direction.

15. The apparatus of claim 1, wherein said mesh sieve is connected to said supporting body by spot welding.

16. An apparatus for removing fine material to be screened from waste water, comprising:
   a sieve grate,
      said sieve grate being designed to be cylindrical.
      said sieve grate having an Inner surface, an interior and an exterior,
      said sieve grate being deigned and arranged to be rotatingly driven,
      said sieve grate being designed and arranged such that waste water can flow from the Interior towards the exterior of said sieve grate,
      said sieve grate Including a supporting body and a mesh sieve,
      said supporting body being located at the exterior of said sieve grate,
      said supporting body being made of a perforated sheet metal including comparatively large openings,
      said supporting body being deigned and arranged to provide resistance and stability to said sieve grate,
      said mesh sieve being located in the interior of said sieve grate,
      said mesh sieve being designed and arranged to form a separation surface, said separation surface being designed and arranged to separate the material to be screened from the waste water in a way that the material to be screened sticks to the separation surface,
      said mesh sieve including openings of a size of approximately between 0.1 and 1.0 mm, and
      said mesh sieve being fixedly connected to said supporting body; and a detaching device, said detaching device being arranged outside of said sieve grate, said detaching device including a plurality of nozzles, said nozzles being designed and arranged to spray a cleaning medium from outside of said sieve grate towards the interior of said sieve grate in a way to detach material to be screened adhering to the inner surface of said sieve grate.

17. The apparatus of claim 16, wherein said sieve grate substantially only consists of said supporting body and said mesh sieve.

18. The apparatus of claim 16, wherein said mesh sieve is fixedly connected to said supporting body in a punctual way.

19. The apparatus of claim 16, wherein said mesh sieve is fixedly connected to said supporting body in regions.

20. The apparatus of claim 16, wherein said supporting body includes comparatively large openings being surrounded by bars, said openings having a surface portion of approximately between 70% and 90% and said bars having a surface portion of approximately between 30% and 10%.

* * * * *